United States Patent [19]
Nishikawa et al.

[11] Patent Number: 4,723,174
[45] Date of Patent: Feb. 2, 1988

[54] PICTURE IMAGE PROCESSOR

[75] Inventors: Eiji Nishikawa; Takashi Ozawa; Fumio Asano, all of Kanagawa, Japan

[73] Assignee: Fuji Xerox Co., Ltd., Tokyo, Japan

[21] Appl. No.: 849,675

[22] Filed: Apr. 9, 1986

[30] Foreign Application Priority Data

Apr. 9, 1985 [JP] Japan .................. 60-74767
Apr. 12, 1985 [JP] Japan .................. 60-78199
Apr. 12, 1985 [JP] Japan .................. 60-78201

[51] Int. Cl.⁴ ............................ H04N 1/40
[52] U.S. Cl. ...................... 358/282; 358/284
[58] Field of Search .......... 358/282, 284, 280; 382/50, 54

[56] References Cited

U.S. PATENT DOCUMENTS 4,491,963  1/1985  Bellemare ............ 358/282
4,539,600  9/1985  Takahashi et al. ...... 358/282
4,623,934  11/1986 Taylor ................ 358/257

FOREIGN PATENT DOCUMENTS 7206170  12/1982  Japan ................ 358/282
8197959  11/1983  Japan ................ 358/282
9207781  11/1984  Japan ................ 358/282

OTHER PUBLICATIONS

G. J. Dohamich et al., "Gain Compensation System for Image Scanners" *IBM Technical Discl. Bul.*, vol. 21, No. 1, 6/78.
D. G. Smith, Jr. "Reflective Document Detector" *IBM Tech. Discl. Bulletin*, vol. 23, No. 1., 6/80.

*Primary Examiner*—Edward L. Coles, Sr.
*Attorney, Agent, or Firm*—Wenderoth, Lind & Ponack

[57] ABSTRACT

A picture image processor wherein a white reference value with respect to an analog output of video data is established in response to a change in luminous energy, and the white reference output is compared with the video data output to obtain a binary signal, and this signal is stored in a memory system; then, the stored signal is subjected to a digital-to-analog conversion to form a reference signal, which is inputted to an A/D converter in synchronism with the respective picture elements of an original reading signal, and/or a dark or bright voltage value of the image sensor which has been previously stored is corrected on the basis of such gain from an amplifying means which changes automatically, and the output of the above image sensor is corrected based on the voltage value thus corrected.

8 Claims, 11 Drawing Figures

PICTURE IMAGE PROCESSOR

BACKGROUND OF THE INVENTION

1. Field of the Invention

This invention relates to video data, and more particularly to a picture image processor which may attain shading correction and binary conditioning for signals without using a high-speed A/D converter or arithmetic circuit, and which may also correct shading distortion without using an A/D converter having a large number of bits, and which may also obtain an exact multiple gradient output even if there is a high dark voltage for an image sensor.

2. Description of the Prior Art

In an image reader wherein a fluorescent lamp or the like is utilized as a light source, the surface of an original is irradiated with the light, and the reflected light is read by an image sensor through lenses; generally there is a nonuniformity of the luminous energy in the light receiving section of the image sensor due to differences in luminous conditions of the respective portions of the fluorescent tube or differences in transmittance of the respective portions of the lenses, and with the passage of time, a temperature rise of the image sensor brings about a ununiform output condition.

Recently, a solid image sensor composed of a CCD device and an optical sensor has been proposed. Such a sensor, however, inevitably has variations in the light-receiving sensitivity of each element, because the sensor is constructed by integrating an array consisting of a number of light receiving elements combined with a CCD multiplexer. Identification of an object to be picked up is significantly influenced by differences in sensitivity between such elements in the case where a difference in level between the object and background noise component is slight, so that there is a case where correct picture image reproduction is damaged.

In recent years, conventional correction for such nonuniformity in luminous energy or sensor sensitivity has been widely effected after the sensor output had been digitized. Most shading correction circuits operate by storing a correction value which has been obtained by first reading a white reference sheet or the like into a RAM, and then reading the correction value simultaneously with the input of a digital signal to be corrected, which is obtained by reading an original, and then inputting the information to the arithmetic circuit.

In this respect, however, with the progress of technology, the frequency of the processing digital signals to be corrected becomes high so that a speeding up of the dynamic sensitivity has been required.

As an example of a picture image processor wherein shading correction is effected by digital processing, there is the processor disclosed in Japanese Laid-open application No. 64867/1983 in which a prescribed amount of attenuation is applied to an output of the detection element of an image sensor to equalize the respective outputs, and the amount of attenuation is stored in a memory; another processor is disclosed in Japanese Laid-open application No. 153377/1984 wherein an original reading signal and a shading correction signal are stored in the memory as addresses.

In these conventional picture image processor, however, complicated arithmetic circuits, high-speed A/D converters and the like are needed to attain a speeding up thereof, so that such processor have a disadvantage due to their high cost.

As still another example of a conventional image processor, there has been provided a processor wherein an analog signal to be used as a reference is digitized by an A/D converter; then, the digitalized signal stored in a memory (RAM), and thereafter, an output signal of the image sensor is synchronized with a memory reference signal for each picture element of a line sensor, whereby a corrected output Z is obtained by means of a digital computing element through the operation of the following equation:

$$Z = X/Y \cdot C \qquad (1)$$

where X is a sensor output, Y is a reference signal, and C is a coefficient.

In the above construction, distortions in the radiant values of the picture image picked up by the sensor, e.g., shading distortion produced from limb darkening derived from the optical system, or irregularity in response characteristics of sensor system and the like have previously been stored in the memory as a reference signal. As a result, when the operation of equation (1) is executed by means of the digital computing element while synchronizing such a reference signal with output signal of the sensor, an output signal Z, whose shading distortion has been corrected, can be obtained. In this case, if the converted precision of the A/D converter is n bits, then the numeric value expressed by the digital operation becomes $2^n$.

Furthermore, there is a method of correction of shading distortion disclosed in Japanese Laid-open application No. 175279/1984 wherein the correction is attained by comparing exact shading distortion which has been previously stored with picture image reading signal.

However, in the above described conventional picture image processor, since a range of expressible values which correspond to variations and which are contained in the reference signal is restricted (for example, when a variation in shading is assumed to be $\pm 2_i$, then the expressible value is $2^{n-2i}$.), in other words, since the effective bit number is restricted to $n-2_i$ bits, it is necessary to use an A/D converter having several more bits than the effective bit number in order to correct shading distortion variations, so that such a processor has a disadvantage due to its high cost.

Moreover, the output voltage of an image sensor used in a picture image processor varies with variations in the luminous energy of the illumination light source to be applied to an original or changes in the ambient temperature and the like. Particularly, in a one-dimensional image sensor wherein a plurality of sensors are aligned along the principal scanning direction of an original, the output voltage does not become uniform due to difference in sensitivity of the sensors for each picture element, so that variations of luminous energy in the principal scanning direction of the illumination light source appear.

In this connection, there has been proposed a prior art picture image processor wherein the output signal of the image sensor is subjected to an analog-to-digital conversion, and then compression and expansion are conducted in a concentration region in response to differences from the reference voltage in order to correct such fluctuations or ununiformity in the output voltage of the image sensor.

In the prior art as described above, however, when an image sensor, having a fluctuating range of dark voltage which is comparatively wide so that the fluctuating range of the output voltage also becomes wide, such as a close contact type amorphous silicon image sensor or the like is utilized, there was a problem in that errors appear in compression or expansion due to the influence of the dark voltage in the concentration range, and as a result thereof, a multiple gradient output is not obtained in an exact manner.

SUMMARY OF THE INVENTION

It is an object of the present invention to provide a picture image processor which can effect shading correction and the like without using a high-speed A/D converter, arithmetic circuit or the like, and which can also correct shading distortion by using an A/D converter having a low number of bits, and further which can obtain an exact multiple gradient output even if there is a high dark voltage for the image sensor.

The picture image processor for realizing the above object according to the present invention comprises reference value in white reference with respect to analog output of video data being established in response to change in luminous energy, the reference output being compared with the video data output to obtain binary signal, a signal to be reference being stored in a memory system, then the signal stored being subjected to digital-to-analog conversion to prepare reference signal, the resulting reference signal being inputted to an A/D converter in synchronous with the respective picture elements of original reading signal, and/or gain of a means for amplifying output signal of an image sensor being changed, the amplified output signal of said image sensor being controlled within the range of a prescribed level, value of dark voltage at the time of interrupting incident light of said image sensor which has been previously stored being corrected in response to the gain of said amplifying means, and the corrected value of dark voltage being subtracted from the controlled output signal of said image sensor to output the resulting value.

BRIEF DESCRIPTION OF THE DRAWINGS

Embodiments of the invention will now be described, by way of examples with reference to the accompanying drawings, in which.

DETAILED DESCRIPTION OF THE PREFERRED EMBODIMENTS

The picture image processor according to the present invention will be described in detail hereinbelow.

Figure 1A:
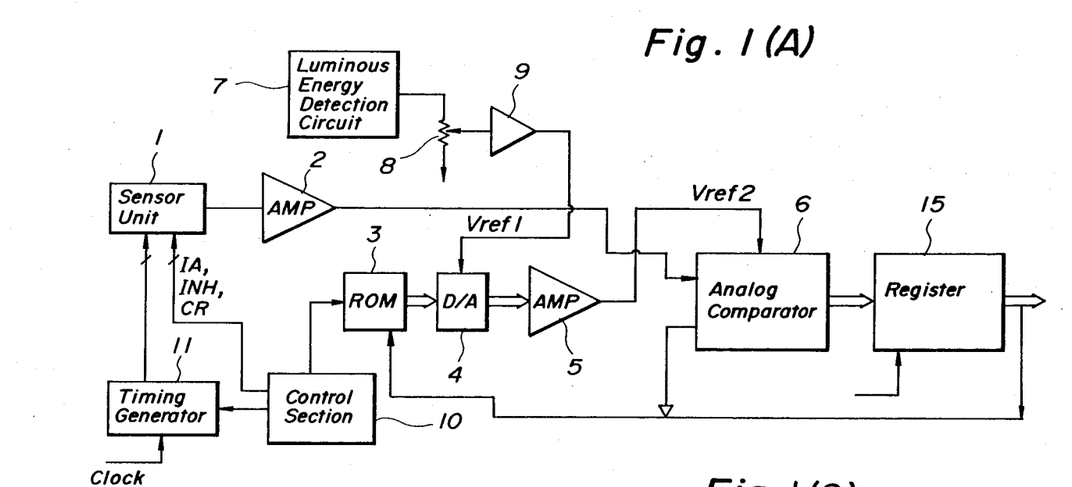
FIG. 1(A) is a block diagram illustrating an embodiment of the present invention.

FIG. 1(A) illustrates an embodiment of the present invention which comprises: a sensor unit 1 for reading an original or a white or other reference plane and to photoelectrically convert the data read; an amplifier 2 for amplifying the output from said sensor unit 1 to a desired level; a ROM 3 in which picture image output data of a white reference (that is, the read data of a white reference level) has previously been stored; a D/A converter 4 for converting the data read from said ROM 3 into analog data; an amplifier 5 for amplifying the output from said D/A converter 4; an analog comparator 6 for comparing the output (white reference data) from said amplifier 5 with the output (video data) of said amplifier 2; a luminous energy detection circuit 7 for detecting the luminous energy on the light receiving surface of sensor; a variable resistor 8 for adjusting the output level of said detection circuit 7; a buffer 9 for buffer-amplifying the output from said variable resistor 8; a control section 10 for applying an address corresponding to a bit of the picture image signal from said sensor unit 1 to said ROM 3, and, at the same time, applying a start pulse $I_A$ for starting reading, a storage time signal INH and a clear signal CR to said sensor unit 1, and for outputting a control signal to a timing generator 11; and a timing generator 11 for controlling the read timing of said sensor unit 1 on the basis of a clock signal.

Figure 1B:
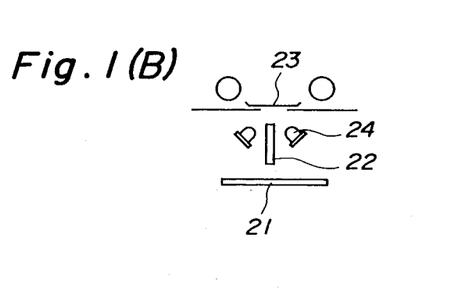
FIG. 1(B) is an explanatory view showing a sensor unit.
Figure 1C:
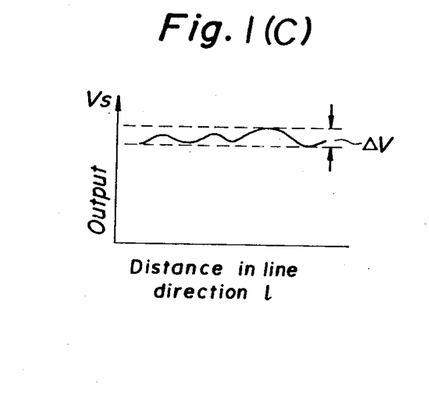
FIG. 1(C) is an explanatory diagram showing reference value involving shading distortion.
Figure 2:
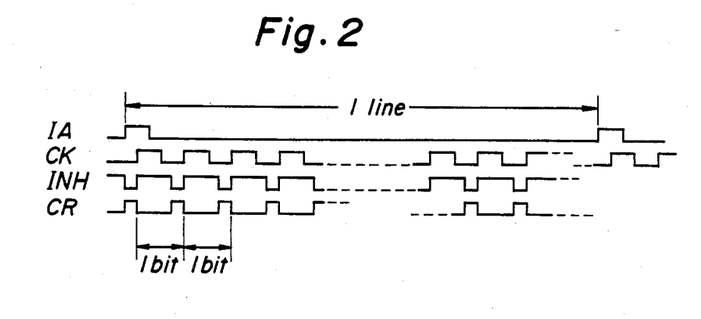
FIG. 2 is a performance timing chart of the sensor unit 1.

The sensor unit 1 is, for example, an a-Si close contact type image sensor which comprises, as shown in FIG. 1(B), a sensor array 21, a reference plane 23, for example, a white or other reference plane, a self-focusing lens 22 for converging the reflected light from the reference plane 23 or from an original (not shown) to the sensor array 21, and a light source 24 for emitting light which impinges upon the reference plane 23 or the original. When the sensor unit 1 reads the reference plane 23, an output involving shading distortion is obtained as shown in FIG. 1(C). The sensor unit 1 is driven by a timing pulse and a start pulse $I_A$ derived from the timing generator 11 and the control section 10, respectively, and the output thereof is serial analog data. As shown in FIG. 2, the start pulse $I_A$ is fed in every 1 line length, and following said pulse, an INH signal is transmitted in synchronism with a clock CK, and when a set time is reached, a clear signal CR for clearing the storage is transmitted. The INH signal and CR signal are output to the sensor unit 1 for every 1 bit. In the ROM 3, the entire number of bits of the detected white reference output, which have been converted by an A/D converter of high resolution have been previously stored.

In the above, construction, the read output of one line in the white reference plane 23 has previously been stored in the ROM 3 for every bit through the A/D converter (not shown) prior to starting to read an original. Such data stored in the ROM 3 contain variations in the distribution of illuminance of the LED array composing the image sensor, and variations in the self-focusing lens and sensitivity of the sensor (FIG. 1(C)), and they are the reference data in the case of correcting signals.

Then, for reading an original, a start pulse $I_A$ is applied to the sensor unit 1, and video data for one line is read in accordance with clocks given by the timing generator 11 one bit at a time. The signal read is amplified by the amplifier 2, and then supplied to the analog comparator 6. On one hand, the white reference output is read in one bit at a time from the ROM 3 in synchronism with bits of the video data output from the sensor unit 1 through the amplifier 2, and these bits are converted into analog information by means of the D/A converter 4. In this case, illuminance of the LED array contained in the sensor unit 1 as the light source is monitored by the luminous energy detection circuit 7, the level of which is established by means of the variable resistor 8, and then such value is given to the D/A converter 4 as reference voltage $V_{ref1}$ through the buffer 9 (e.g.—an amplifier having a 1:1 input/output level), whereby initialization is effected such that output ($V_{ref2}$) of the amplifier 5 becomes equal to the entire number of bits. The video data output from said amplifier 5 is always compared with said reference data at a certain ratio to digitalize the result. Thus, signal correction of a high precision can be realized. When luminous energy of the LED array changes, the level in signal output changes also. In this case, however, since the reference voltage $V_{ref1}$ in the D/A converter 4 also varies simultaneously with said changes, precision in such detection does not deteriorate even if there is a variation in luminous energy. The output data from the analog comparator 6 is stored in the register 15 as the picture image data.

Figure 3:
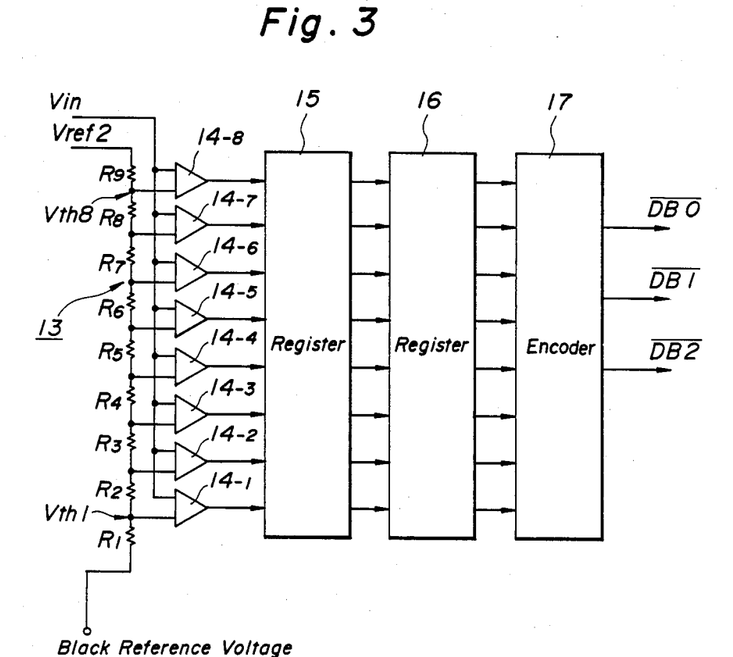
FIG. 3 is a circuit diagram showing the details of the analog comparator 6 of FIG. 1.

FIG. 3 shows the details of the analog comparator 6 which comprises a resistor group 13 composed of serially connected resistances $R_1$-$R_9$ which divide the output voltage of the amplifier 5, voltage comparators $14_{-1}$-$14_{-8}$ for comparing the voltage $V_{in}$ from an amplifier (not shown) with reference voltages $V_{th1}$-$V_{th8}$ from the resistances $R_1$-$R_9$, a buffer register 15 for storing the respective outputs of said voltage comparators $14_{-1}$-$14_{-8}$, a buffer register 16 for storing the contents of said register 15, and an encoder 17 for converting the contents of said buffer register 16 into a 3 bit digital output. The comparators $14_{-1}$-$14_{-8}$ described above are for detecting 8 gradations and for converting the detected result into 3 bit outputs (DB$_0$, DB$_1$, DB$_2$), and specific examples of which include part number "4905" manufactured by the Harris Corp., part number "MC 3430" manufactured by Motorola Ltd. and the like. The 8 bit registers, may be, for example, part number 74LS273.

Voltage $V_{th}$ for comparison with respect to the voltage comparator 6 is given by the following equation:

$$V_{th}(m, k) = \frac{\sum_{n=1}^{k} R_n}{\sum_{n=1}^{9} R_n} \times V_{ref2(m)}$$

where $V_{ref2(m)}$ is the output voltage of the m-th bit white reference in sensor output, $V_{th}(m, k)$ is the comparison voltage in the k-th gradation in the m-th bit of sensor output, and $T_n$ is one of the resistance values $R_1$-$R_9$.

Figure 4:
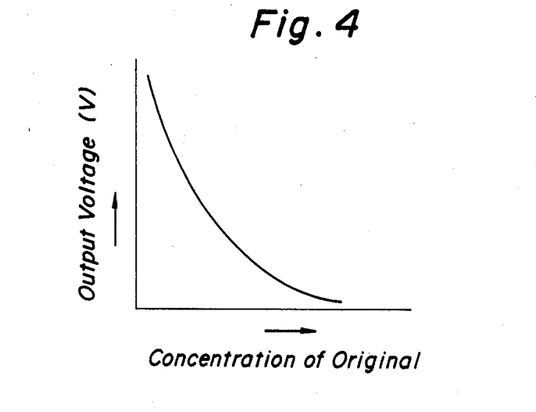
FIG. 4 is a characteristic diagram showing a relationship between output of a sensor and the optical picture image concentration.

When such a voltage to be inputted to the m-th bit comparator of the sensor 1 is represented by $V_{in}(m)$, the output of the comparator varies in dependance upon whether or not the condition ($V_{in}(m) > V_{th}(m, k)$) is satisfied. The data thus obtained is stored in the buffer register 15 at the time of sampling and further in the buffer register 16, and is thereafter converted into a 3 bit digital output by means of the encoder 17. It is to be noted that each value of the resistances $R_1$-$R_9$ is preset such that the output at each connecting point is nonlinear. A relationship between optical image concentration and voltage to be output is graphically indicated, the curve may be plotted as shown in FIG. 4. In this respect, detection in 8 gradation can precisely be conducted at picture image concentration level in such a manner that the detection range composed of black and white levels is removed from logarithmic change and the values of the resistances $R_2$-$R_8$ are logarithmically changed from a practical point of view.

In the above embodiment, since reference voltage $V_{ref1}$ in the D/A converter is changed with changes in the luminous energy, there is a disadvantage in that the precision of the detection deteriorates slightly, when the output of luminous energy decreases. This is because a heat release value is significant in the case where an LED array is used, so that if luminous energy is intended to be constant, there is a fear of thermo runaway. In this respect, when correction in luminous energy is effected with respect to a light source wherein very little heat generation is observed, such as fluorescent tube light source, it is possible to set $V_{ref1}$ at a constant value so that the precision of detection can be made more favorable.

Furthermore, when the resistances $R_1$-$R_9$ of the resistor group 13 are suitably selected, the analog comparator 6 can simply realize processing such that, for example, the resolution in a specified concentration region elevates and an output corresponding to the actual picture image concentration is obtained.

As described above, according to the picture image processor of the present invention, a reference value corresponding to an analog conversion output of video data at a white reference level is preset in response to luminous energy, whereby a corrected white reference value is compared with a video data value to obtain binary signal, so that shading correction can be effected without using an arithmetic circuit, a high-speed A/D converter or the like.

Figure 5:
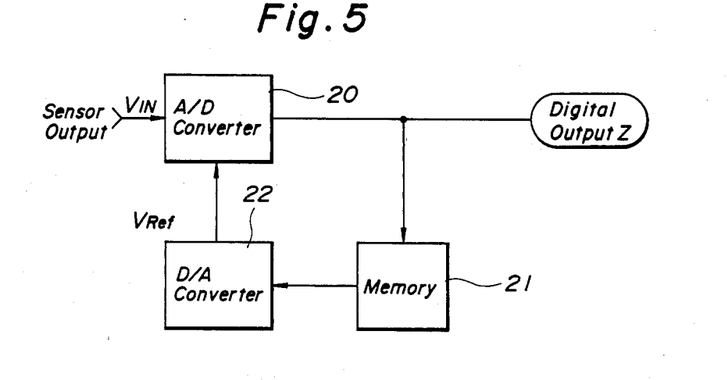
FIG. 5 is a block diagram illustrating another embodiment of the present invention.

FIG. 5 illustrates another embodiment of the present invention which comprises an A/D converter 20 which reads picture image of an original or the like, inputs read information from a line sensor (which will be described hereunder) for every picture element having an analog value, and converts this analog value into a digital value to output the same, a memory (RAM) 21 for storing the reference signal output from said A/D converter at the time when the line sensor reads a reference plane, and a D/A converter 22 for converting the reference data read from said memory 21 to supply the data thus converted to the A/D converter 20 as the reference signal.

Figure 6:
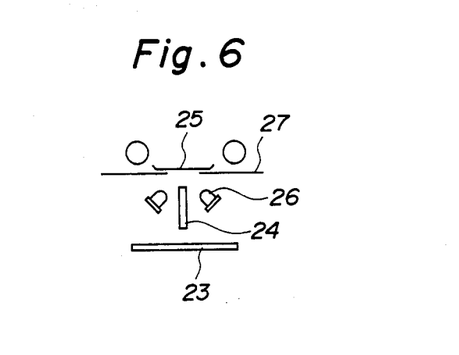
FIG. 6 is an explanatory view showing the read section of the embodiment illustrated in FIG. 5.

FIG. 6 shows a read section involving a line sensor 23 which comprises a reference plane 25 (for example, a white plane) placed at the read position of a platen 27, a light source 26 such as an LED, fluorescent tube or the like which illuminates the read position, and the line sensor 23 for receiving the reflected light from the reference plane 25 or original (not shown) on the read position through a self-focusing lens (rod lens) 24 to output a read signal.

In the above construction, the reference signal is prepared prior to reading the picture signal of original and the like. Namely, the reference plane 25 is read by the line sensor 23, the read information is digitally converted by the A/D converter 20, and then stored in the memory 21.

Reference signal $V_s$ stored in the memory 21 involves shading variations $\Delta V$ along the direction l as shown in FIG. 1C; this signal is digitized by means of the A/D converter 20, and then stored in the memory 21. When the reading of the reference plane 25 is completed, an original (not shown) is fed to the read position of the platen 27 and then read. When starting to read the original, the reference data stored in the memory 21 is converted into an analog value by means of the D/A converter 22. This analog voltage is fed to the A/D converter 20 as reference input $V_{Ref}$ while synchronizing the same with the read signal of the original. The A/D converter 20 corrects shading distortion in original read signal $V_{IN}$ on the basis of the reference signal $V_{Ref}$ to output the read signal.

More specifically, it may be expressed by the following equation:

$$Z = V_{IN}/V_{Ref} \qquad (2)$$

In equation (2), $V_{IN} = V_{Ref}$ corresponds to the maximum effective bit number that can be taken for A/D conversion. In the case of an A/D converter involving an n bit resolution, the minimum resolution is $V_{Ref}/2^n$.

In the case where a 6 bit flash A/D converter is used in accordance with the present invention, if a sensor involves a ±30% fluctuation, signals of 64 levels can be taken. In a similar case, only 16 levels can be taken in accordance with a conventional system. In other words, this means that an 8 bit A/D converter is required in such conventional system, whilst a 6 bit A/D converter is sufficient for the present invention.

As described above, in accordance with the picture image processor of the present invention, reference data is stored in the memory, and then the value obtained by converting the stored data to an analog value is supplied to the A/D converter as reference signal, so that shading distortion involving fluctuations can be corrected by the use of an A/D converter having a low number of bits. Besides, the number of bits may be lowered in the present invention so that number of signal conductors can be reduced, and thus, miniaturization of circuit may be simplified.

Figure 7:
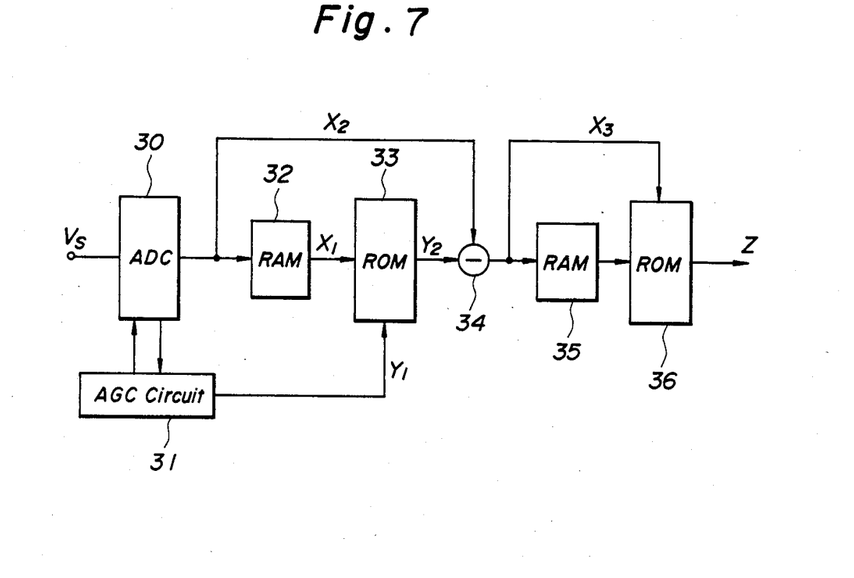
FIG. 7 is a block diagram illustrating another embodiment of the present invention.

FIG. 7 is a block diagram illustrating another embodiment of the present invention which comprises an A/D converter 30 for converting an output signal $V_s$ of an image sensor (not shown) into a digital signal $X_2$ having a prescribed number of bits (for example, n bits), an automatic gain control circuit (AGC circuit) 31, a first memory (RAM) 32 for storing a dark voltage value $X_1$ at the time of interrupting incident light with respect o the image sensor, a signal correcting ROM 33 for correcting the dark voltage value $X_1$ stored in the first memory 32 with signal $Y_1$ output from the AGC circuit 31 and for representing the conversion gain of the A/D converter 30 so as to thereby output the corrected value, a subtracter 34 for obtaining a difference signal:

$$X_3 = X_2 - Y_2$$

between the signal $X_2$ output from the A/D converter 30 and the signal $Y_2$ output from the signal correcting ROM 33 with the commencement of reading picture image, a second memory (RAM) 35 for storing a bright voltage value $Y_3$ at the time of incidence of reference light (such as white light or the like) with respect to the image sensor, and a signal correcting ROM 36 for correcting the output signal $X_3$ from the subtracter 34 on the basis of the bright voltage value $Y_3$ stored in the second memory 35 to output the corrected signal.

Said automatic gain control circuit 31 controls the converted gain of said A/D converter 30 such that when the conversion value of the A/D converter 30 exceeds the maximum conversion value and the overflow output reaches "H", the reference electrical potential of A/D converting operation in the A/D converter 30 is elevated, whilst the reference electrical potential is lowered when the overflow output reaches "L", whereby the converted output value of the A/D converter 30 is always maintained within a certain range.

Said dark voltage value $X_1$ is measured by the use of the image sensor whose output signal is to be corrected immediately before starting to read the picture image of an original or in every certain period; the measured value is converted into a digital signal by means of the A/D converter 30, and then stored in said first memory 32. However, the AGC circuit 31 does not operate in the case when the dark voltage value $X_1$ is stored, but the current dark voltage itself in the image sensor is stored in the first memory 32 as the analog-to-digital converted value $X_1$.

In a memory address having signals $X_1$ and $Y_1$ as its lower and upper addresses, respectively, the corrected value $Y_2$ of the signal $X_1$ which is expressed by the following equation:

$$Y_2 X_1 \cdot Y_1 \qquad (1)$$

is stored.

As in the case of said dark voltage value $X_1$, said bright voltage value $Y_3$ is measured by the use of the image sensor whose output signal is to be corrected immediately before starting to read the picture image of an original or in every certain period, the measured value is converted into a digital signal by means of the A/D converter 30, and then stored in said second memory 35. However, the AGC circuit 31 also does not operate in the case when the bright voltage value $Y_3$ is stored, but the current bright voltage itself in the image sensor is stored as the analog-to-digital converted value $Y_3$.

In a memory address having signals $X_3$ and $Y_3$ as its lower and upper addresses, respectively, the corrected value Z of the signal $X_3$ which is expressed by the following equation:

$$Z = (X_3/Y_3) \times Z^n \qquad (3)$$

is stored. Equation (3) indicates the number of bits of the output signal in the A/D converter 1.

In the above, construction, the signal $V_s$ output from the image sensor when starting to read the picture image of an original is converted into digital signal $X_2$ of n bit construction in the A/D converted 30. In this case, the conversion gain of the A/D converter 30 is controlled by the AGC circuit 31 such that the value of signal $X_2$ is always contained within a certain range. The reason for controlling conversion gain of the A/D converter 30 is to improve the conversion precision.

On one hand, when starting the reading of the original's picture image, signal $Y_2(=X_1 \cdot Y_1)$ obtained by correcting the dark voltage value $X_1$ in the image sensor with the signal $Y_1$ indicating the conversion gain of the A/D converter 30 is output from the signal correcting ROM 33.

In other words, the equivalent signal $Y_2$ obtained by passing dark voltage value $X_1$ through a converter of gain $Y_1$ is output from the signal correcting ROM 33.

These two signals $X_2$ and $Y_2$ are inputted to the subtracter 34 where the signal $Y_2$ is subtracted from the signal $X_2$. More specifically, the dark voltage component $Y_2$ contained in the signal $X_2$ is subtracted. Thus, signal $X_3$ which is composed of only the picture signal which does not contain a dark voltage component is output from the subtracter 34.

Then, this signal $X_3$ which does not contain a dark voltage component is inputted to the signal correcting ROM 36. At this occasion, the bright voltage value $Y_3$ which has previously been stored in the second memory 35 is also inputted to the ROM 36.

As a result, the signal Z which is expressed by the following equation:

$$Z = (X_3/Y_3) \times 2^n$$

is output from the ROM 36.

Figure 8:
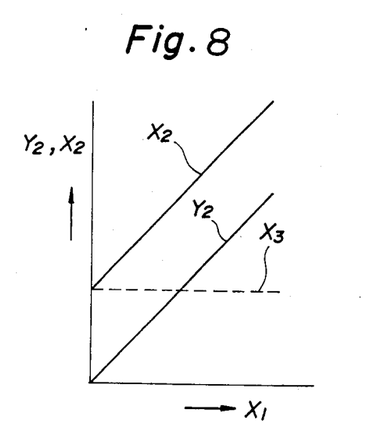
FIG. 8 is a graphical representation indicating a relationship between the dark voltage and output signal of an image sensor.

When the dark voltage $X_1$ in the image sensor increases, the picture image signal $X_2$ read increases also as shown in the graph of FIG. 8, even if concentration of the read picture image is constant. In this case, however, the correcting signal $Y_2$, being proportional to increases in the dark voltage $X_1$, is output from the signal correcting ROM 33 and is subtracted from the signal $X_1$. Hence, the signal $X_3$ depends only upon the concentration of the read picture image, irrespective of the dark voltage $X_1$ which is removed by the subtracter 34, as indicated by the broken line in the graphical representation of FIG. 8.

Figure 9:
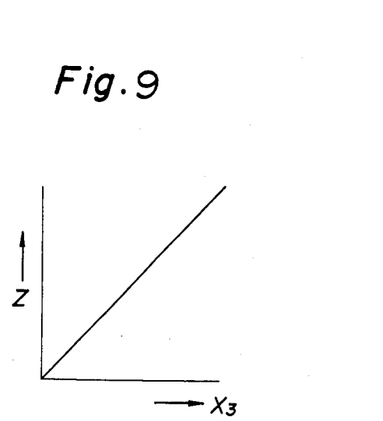
FIG. 9 is a graphical representation indicating a relationship between a signal from which the dark voltage component is removed and the final output signal.

The absolute level of said signal $X_3$ merely depending on the concentration of the read picture image becomes insufficient, because of the removal of the dark voltage component $X_1$. In this connection, the absolute value of said signal $X_3$ is amplified by means of a proportional operation wherein the bright voltage value $Y_3$ at the time of incidence of the reference light is utilized as the reference as indicated by the graph in FIG. 9. As a result, the signal $X_3$, which does not contain a dark voltage component of the image sensor, is converted into the signal Z having a gradation in which the brightness of reference light is utilized as the reference and the converted signal is output.

In this case, the dark and bright voltage values $X_1$ and $Y_3$ stored in the first and second memories 32 and 35, respectively, have already contained therein fluctuation components of the optical system such as fluctuation components in luminous energy of an illuminating light source and the like. For this reason, in the picture image processor according to the present invention, not only the fluctuation in dark voltage, but also the fluctuation of the output signal in the image sensor due to the fluctuation component of the optical system are corrected.

While the output signal of the image sensor is corrected in accordance with digital signal processing in the present embodiment, analog signal processing may also be applied. In the case of analog signal processing, the processor may be constructed such that a variable gain type amplifier is used as the A/D converter 30, the first and second memories 32 and 35 are composed of analog memories, and both the signal correcting ROM 33 and 36 are composed of analog arithmetic circuits.

For the sake of simplicity in the explanation, although it has been assumed in the above embodiment that the image sensor performs a photoelectrical conversion of a single picture element, for example, a unidimensional image sensor, a plurality of sensors which are aligned along a principal scanning direction of an original may be employed and in such a case, the dark and bright voltage values $X_1$ and $Y_3$ are independently stored with sensor unit of the respective picture elements, so that the whole circuit shown in FIG. 7 may be used in a time-sharing manner for every picture element.

As is clear from the above description, according to the present invention, that the dark voltage of an image sensor has previously been stored prior to starting to read the picture image, and the dark voltage component is subtracted from such image sensor output signal after starting to read the picture image thereby outputting the resulting signal, so that an always stable multiple gradient output signal can positively be taken out in even the case where there are fluctuations in the dark voltage component.

Although the particular embodiments of the invention have been shown and described, it will occur to those with ordinary skill in the art that other modifications and embodiments exist as well fall within the true spirit and scope of the invention as set forth in the appended claims.

We claim:

1. A picture image processor wherein video data obtained by reading an original by means of an image sensor converted into a binary signal, and information recording processing and information reproduction processing are effected on the basis of said signal, which comprises establishing a white reference value with respect to an analog output of said video data in response to a change in luminous energy, said white reference value being compared with the video data output to obtain said binary signal and a resultant signal is then stored, said stored signal being subjected to digital-to-analog conversion to form a reference signal, said reference signal being subjected to analog to digital conversion in synchronism with the respective picture elements of said binary signal, and/or a dark or bright voltage value of said image sensor which has been previously stored being corrected on the basis of a gain from an amplifying means which is changed for controlling an output of said image sensor so as to always be at a prescribed level, and the output of said image sensor being corrected based on said corrected voltage value.

2. A picture image processor as claimed in claim 1, wherein said processor comprises: a memory in which data for reading reference plane are stored; a luminous energy detecting means for detecting changes in luminous energy of a sensor light source and for outputting a first refernece voltage on the basis of the resulting detection amount; a reference signal generating means for outputting a second reference voltage obtained by correcting data read from said memory on the basis of said first reference voltage in synchronism with video data of said original, and a comparing means for comparing said second reference voltage with said video data of said original to output video data whose shading distortion has been corrected.

3. A picture image processor as claimed in claim 2, wherein said comparing means comprises a resistor group for dividing said second reference voltage into a plurality of divided output voltages, and a plurality of voltage comparators for respectively comparing said divided output voltages derived from said resistor group with said video data of said original.

4. A picture image processor as claimed in claim 1, wherein said processor comprises: an A/D converter for inputting said reference signal in sychronism with the respective picture elements of said video data signal and for subjecting said video data signal to an analog-to-digital conversion on the basis of said reference signal to effect correction of shading distortion, a memory for storing said reference signal which is obtained by reading an entire surface of a reference which is all of a same color by means of said image sensor and converting same by said A/D converter so as to generate said reference signal, and a D/A converter for converting said reference signal read from said memory to an analog signal and for outputting the converted signal to said A/D converter for use as a reference voltage.

5. A picture image processor as claimed in claim 1, wherein said processor is provided with an amplifying means for amplifying an output signal of said image sensor, an automatic gain controlling means for changing a gain of said amplifying means and for controlling the amplified output signal of said image sensor so as to be within a prescribed level range, a memory means for storing a dark voltage value at the time of interrupting incident light to said image sensor, a correcting means for correcting the dark voltage value stored in said memory means in response to the gain of said amplifying means to output the corrected result, and an operating means for subtracting the dark voltage value corrected by means of said correcting means from the output signal of said controlled image sensor so as to output the resulting value.

6. A picture image processor as claimed in claim 5, wherein said amplifying means is composed of an A/D converter for converting an output signal of an image sensor into a digital signal of a prescribed number of bits, and said automatic gain controlling means is composed of a circuit for controlling a reference potential of said A/D converter such that the converted output value of said A/D converter is within a certain range.

7. A picture image processor as claimed in claim 1, wherein said processor is provided with an amplifying means for amplifying output signal of said image sensor, an automatic gain controlling means for changing a gain of said amplifying means and for controlling the amplified output signal of said image sensor so as to be within a prescribed level range, a first memory means for storing a dark voltage value at the time of interrupting incident light to said image sensor, a first correcting means for correcting the dark voltage value stored in said first memory means in response to the gain of said amplifying means so as to output the corrected result, an operating means for subtracting the dark voltage value corrected by means of said first correcting means from the output signal of said controlled image sensor so as to output the resulting value, a second memory means for storing bright voltage value at a time of incidence of a reference light with respect to said image sensor, and a second correcting means for correcting the output from said operating means on the basis of the bright voltage value stored in said second memory means so as to output the corrected result.

8. A picture image processor as claimed in claim 6, wherein said amplifying means is composed of an A/D converter for converting an output signal of an image sensor into a digital signal of a prescribed number of bits, and said automatic gain controlling means is composed of a circuit for controlling a reference potential of said A/D converter such that the converted output value of said A/D converter is within a certain range, and said second correcting means is composed of a division circuit for dividing the output from said operating means by said bright voltage value so as to output the resulting value.

* * * * *